United States Patent
Kikuchi

(10) Patent No.: US 8,576,432 B2
(45) Date of Patent: Nov. 5, 2013

(54) PRINT SERVICE SYSTEM AND PRINT PROCESSING METHOD

(75) Inventor: Koji Kikuchi, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 392 days.

(21) Appl. No.: 13/091,935

(22) Filed: Apr. 21, 2011

(65) Prior Publication Data

US 2011/0261407 A1    Oct. 27, 2011

(30) Foreign Application Priority Data

Apr. 26, 2010  (JP) ................. 2010-100828

(51) Int. Cl.
*G06F 3/12* (2006.01)
*G06F 15/16* (2006.01)

(52) U.S. Cl.
USPC ....... 358/1.15; 358/1.16; 358/1.13; 358/1.14; 709/201; 709/203; 709/217; 709/218; 709/219

(58) Field of Classification Search
USPC ................ 358/1.1, 1.9, 2.1, 1.11–1.18; 709/201–203, 212–219
See application file for complete search history.

(56) References Cited

U.S. PATENT DOCUMENTS

| | | | |
|---|---|---|---|
| 6,970,263 B2* | 11/2005 | Suzuki et al. | 358/1.15 |
| 7,124,094 B1* | 10/2006 | Kobayashi et al. | 705/64 |
| 2004/0117389 A1* | 6/2004 | Enami et al. | 707/100 |
| 2005/0138065 A1* | 6/2005 | Ciriza | 707/104.1 |
| 2005/0171914 A1* | 8/2005 | Saitoh | 705/51 |
| 2005/0213152 A1* | 9/2005 | Suzuki et al. | 358/1.15 |
| 2005/0225796 A1* | 10/2005 | Horihata | 358/1.15 |
| 2005/0278230 A1* | 12/2005 | Shirasaka et al. | 705/26 |
| 2007/0041044 A1 | 2/2007 | Tanaka | |
| 2008/0043278 A1* | 2/2008 | Suzuki | 358/1.15 |

FOREIGN PATENT DOCUMENTS

JP    2007-052694 A    3/2007

* cited by examiner

*Primary Examiner* — Chad Dickerson

(74) *Attorney, Agent, or Firm* — Canon USA, Inc., IP Division

(57) ABSTRACT

A PODSS acquires from a job ordered from the client PC, limited access information for accessing an APSS. If a user selects the received job from an MFP, and if it is necessary to access the APSS, the PODSS notifies the MFP of the access information. The MFP then uses the notified access information to request the APSS for a corresponding application service. The PODSS receives processed service data and generates print data to be transmitted to the MFP.

4 Claims, 14 Drawing Sheets

FIG. 14

```
                          701
                           )
     702              ORDER INPUT
      )  ┌─────────────────────────────────────┐
         <CLIENT INFORMATION>
                 CLIENT NAME: [TARO YAMADA    ]
     703 SHIPPING ADDRESS: [XXX, TOKYO      ]
      )
         <PRODUCT>
              NUMBER OF COPIES: [1000         ]
                   PAPER TYPE: [GLOSSY PAPER ]
     704             SIZE: [A4           ]
      )
         ◯ DIRECT PRINT
                   FILE: [                ] [REFERENCE]

◯ PROCESS AND PRINT
              APPLICATION
     705    SERVICE NAME: [AAA                       ]

USE APPLICATION SERVICE
         1401 ─☐ EMPLOYING ACCESS INFORMATION
                       IN POD SERVICE SERVER

APPLICATION  [http://xxx.yyy?zzz       ]
              SERVICE URL:

FILE: [AAA.doc         ] [    ]

CONTENT OF PROCESSING REQUEST:
         [A4-SIZE BOOKBINDING PRINTING           ]

706 ─[ORDER]
```

PRINT SERVICE SYSTEM AND PRINT PROCESSING METHOD

BACKGROUND OF THE INVENTION

1. Field of the Invention

The present invention relates to a print service system and a print processing method for processing a job received from an information processing apparatus.

2. Description of the Related Art

Nowadays, there are cases where a general home-use or office-use multifunction peripheral (MFP) or a printer cannot perform printing desired by a user. Examples of such cases are printing a large amount of data, printing that require high-level processing (e.g., imposition and color adjustment), and wide-format printing.

A print on demand (hereinafter referred to as POD) service performs such special print processing desired by the user. A POD service provider receives a print order from a customer, performs print processing according to a requested content, provides a printed product to the customer, and collects a service fee from the customer.

For example, the POD service provider receives an order to print new year cards for home use, and an order to print A1 size posters or catalogues for office use. The customer previously prepares ordering data, such as images captured using a digital camera, or an electronic document created using commercially available application software (hereinafter referred to as an application).

Since the type of data to be processed is dependent on the applications possessed by the POD service provider, the customer prepares a data format that can be received by the POD service provider. A conventional technique for extending the types of data to be processed in the above-described POD service will be described below. The customer adds as order information, information about the application that the customer has used to previously process the ordering data (herein after referred to as application processing information). The POD service provider then converts the application processing information to a data structure of the application used by the POD service provider, and performs processing or printing using the application possessed thereby (For example, refer to Japanese Patent Application Laid-Open No. 2007-052694).

The conventional technique discussed in Japanese Patent Application Laid-Open No. 2007-052694 is predicated on both the customer and the provider of the POD service possessing the applications. However, in recent years, application software has become increasingly webified, and there has been a spread in providing application on the Internet as a service.

More specifically, the application performs processing on a server located on the Internet, and only an operation screen operates on a personal computer (PC) of a user. In such a service, it is necessary for the user to previously enter an agreement with the application provider. After entering the agreement, the application provider provides to the user access information that is unique for each user, so that the user uses the application employing the access information.

The application provider then collects from the user a fee agreed upon in the agreement, such as a monthly fixed fee or an usage based rate according to an access amount (hereinafter, such a service will be referred to as an application service).

Further, by a wide-spread use of the application service, there has also been an increase in the types of application used by the user according to usage. It has thus become difficult to continue the agreement that is dependent on the applications possessed by the POD service provider such as in the conventional POD service.

If the above-described agreement cannot be entered between the customer and the POD service provider, the POD service provider cannot predict the types of applications that the customer has used. It thus becomes necessary for the POD service provider to enter an agreement in advance with an application service provider that provides a certain number of applications. However, the POD service provider may enter an agreement with a service provider about unnecessary applications.

Furthermore, the customer uses various types of applications in the technique discussed in Japanese Patent Application Laid-Open No. 2007-052694. Since data format analysis and creation of a conversion process become necessary in converting the data to the data format of the application used by the customer, conversion efficiency becomes low.

SUMMARY OF THE INVENTION

According to an aspect of the present invention, a print service system includes an information processing apparatus, an image processing apparatus, a first server apparatus configured to provide an application service to the information processing apparatus, and a second server apparatus configured to receive a print job generated by the information processing apparatus using an application service and provide a print service, wherein the second server apparatus includes a management unit configured to register, from a job ordered from the information processing apparatus, to a storage unit and manage access information to which information for limiting an application service is added, and received order data, a transmission unit configured to transmit to the image processing apparatus, received order data and the access information according to a print request from the image processing apparatus, a receiving unit configured to receive from the first server apparatus print data generated according to a request from the image processing apparatus, and a transferring unit configured to transfer to the image processing apparatus the print data received by the receiving unit, wherein the image processing apparatus includes a requesting unit configured to receive the access data and received order data from the second server apparatus, and request, using the access information the first server apparatus for an application service with respect to the received order data, and a printing unit configured to receive from the second server apparatus and print the print data corresponding to the received order data requested by the image processing apparatus to the first server apparatus, and wherein the first server apparatus includes a determination unit configured to determine, according to the access information acquired from the image processing apparatus, whether to allow or disallow an application service request with respect to the received order data, a generation unit configured to perform, if the determination unit allows an application service request, an application service with respect to received order data received from the image processing apparatus and generating print data, a transferring unit configured to transfer to the second server apparatus the print data generated by the generation unit, and a charging unit configured to charge a registered customer identified by the access information, every time an application service is performed with respect to received order data requested from the image processing apparatus.

According to the present invention, the image processing apparatus can use the application service provided by the first server by employing the access information assigned to a print job received by the second server apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 14 illustrates a UI displayed on the client PC.

DESCRIPTION OF THE EMBODIMENTS

Various exemplary embodiments, features, and aspects of the invention will be described in detail below with reference to the drawings.
<Description of a System Configuration Example>

Figure 1:
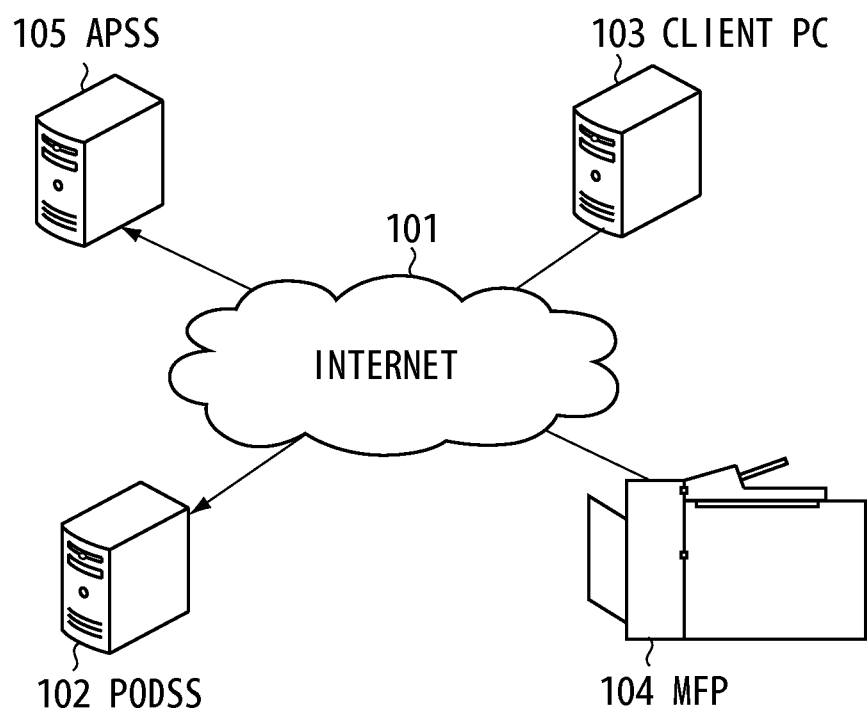
FIG. 1 illustrates a configuration of a print service system according to an exemplary embodiment of the present invention.

FIG. 1 illustrates a configuration of a print service system according to a first exemplary embodiment of the present invention. The print service system illustrated in FIG. 1 is an example of a configuration of a POD system that is applicable to cloud computing.

According to the present exemplary embodiment, a MFP will be described as an example of the image processing apparatus. However, the present invention is also applicable to a printing apparatus. Further, the system according to the present exemplary embodiment includes an application service server as a first server apparatus and a POD service server as a second server apparatus.

Furthermore, the information processing apparatus in the system is a client PC 103. However, the number of client PCs is not limited to the example according to the present exemplary embodiment. Moreover, the system according to the present exemplary embodiment is capable of using a cloud computing system, and the first server apparatus provides to a data processing apparatus used by the customer, the application service that performs various data processing such as document processing and spreadsheet processing.

Referring to FIG. 1, the client PC 103 and an MFP 104 are connected to a POD service server (PODSS) 102 and an application service server (APSS) 105 on the Internet via each local area network (LAN) and firewall.

A predetermined operating system (OS) is installed in the PODSS 102 and the APSS 105, so that the applications (e.g., a web browser) installed in the PODSS 102 and the APSS 105 are executable.

According to the present exemplary embodiment, the PODSS 102 also functions as a storage server. However, the system may independently include a storage server that manages received jobs.

The PODSS 102 is a web server that provides a series of processes from receiving an order to shipping a product in the POD service. For example, the PODSS 102 receives an order from the client PC 103 used by the customer, and stores in a storage unit and manages received order information as the received job. The storage unit is, for example, a hard disk drive (HDD) 210 illustrated in FIG. 2. However, the storage unit may be any other storage media.

Further, the PODSS 102 expands, in response to a print request and a processing instruction from the MFP 104, the received job that is spool-managed. The PODSS 102 then provides the print data or activates the necessary application service.

Furthermore, the PODSS 102 manages the received jobs in a table stored in the storage unit. Such received jobs include limited access information for accessing the APSS 105 set by the customer using the client PC 103. The table will be described in detail below.

Moreover, the PODSS 102 transmits to the MFP 104, the received order data and the access information, according to a print request from the MFP 104. The process will be described in detail below with reference to a flowchart.

The client PC 103 includes the web browser, accesses the APSS 105 using the access information acquired by entering the agreement with the application service provider, and generates a document using the application service. The APSS 105 charges the client PC 103 for the application used thereby according to the access information.

Further, the MFP 104 issues an application service request to the APSS 105 using the access information set by the customer using the client PC 103 and managed in the PODSS 102. In such a case, the APSS 105 charges for the application used by the MFP 104 according to verified authenticated information.

The customer using the client PC 103 sets a limit to the above-described access information, so that a usage period and the functions to be used by the MFP 104 can be restricted. An operator of the MFP 104 is thus controlled not to receive unlimited application service.

Furthermore, the client PC 103 accesses the PODSS 102 via the web browser, and issues an order of the POD service. The MFP 104 also includes the web browser, and performs print processing of the received job in the PODSS 102. If the MFP 104 is to perform print processing of the received job using the application service provided by the APSS 105, the MFP 104 uses the limited access information provided by the PODSS 102 to use the application. The web browser in the MFP 104 then displays the application, and the operator operates on the web browser.

The APSS 105 includes a web server function, and allows the application service to be used from the web browsers in the client PC 103 and the MFP 104. Further, the APSS 105 provides print data to the PODSS 102 according to a print instruction issued after editing. The PODSS 102 uses a printer driver to convert application data received from the APSS 105 to the print data that is printable by the MFP 104, and provides the print data to the MFP 104.

Furthermore, the APSS 105 determines whether to allow or disallow a request for the application service with respect to the received order data, according to the access information acquired from the MFP 104. The process is performed according to the flowchart to be described below.

<Description of Hardware Configuration of Each Service Server and the Client PC>

Figure 2:
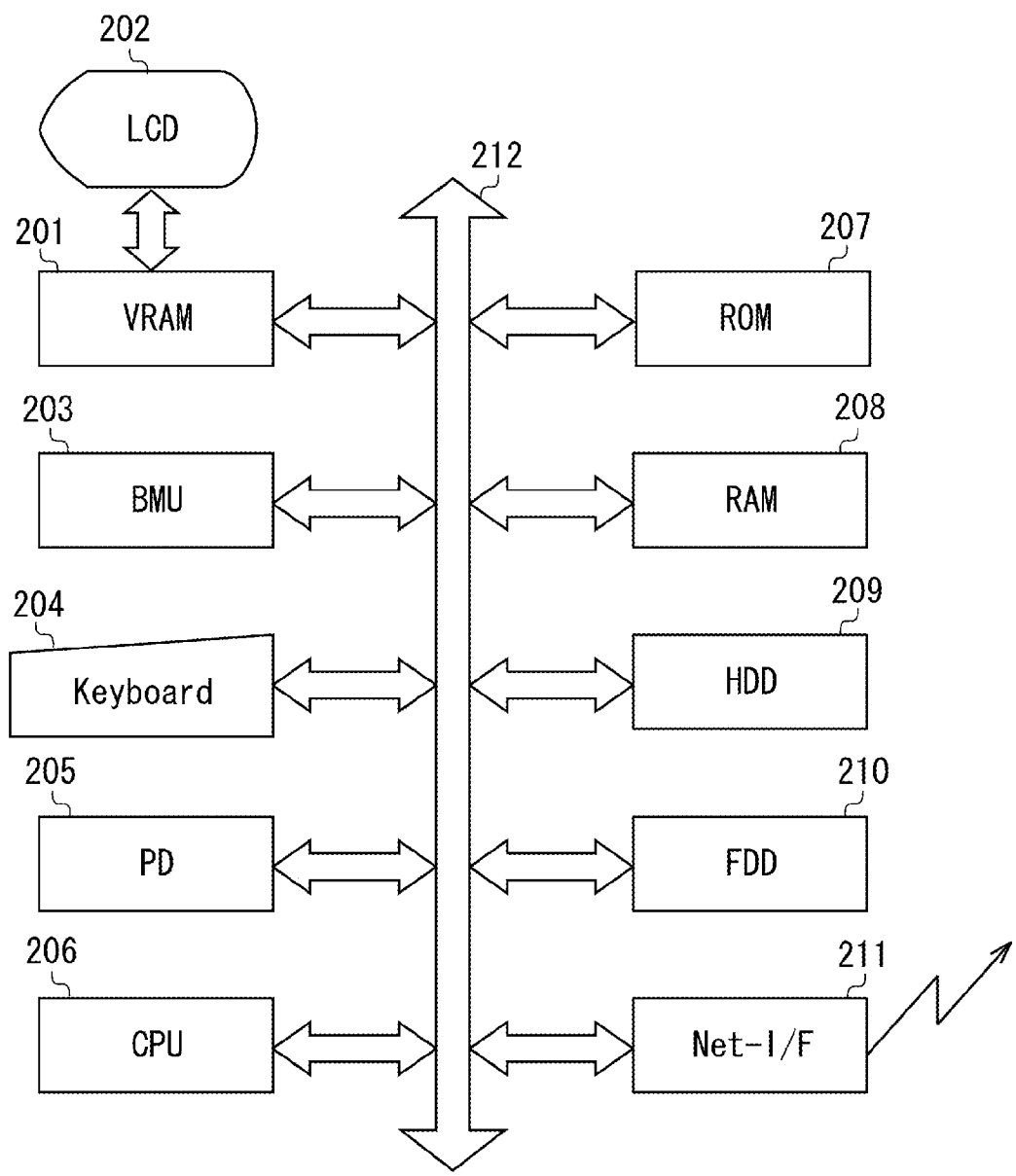
FIG. 2 illustrates a configuration of a server apparatus and an information processing apparatus according to an exemplary embodiment of the present invention.

FIG. 2 illustrates a hardware configuration of the PODSS 102, the APSS 105, and the client PC 103 illustrated in FIG. 1. Since each of the PODSS 102, the APSS 105, and the client PC 103 is a PC, the hardware configuration thereof may be similar, and unique hardware is not necessary for each of the apparatuses.

Referring to FIG. 2, a video random access memory (VRAM) 201 expands and stores characters and images to be displayed on a screen of a display device (i.e., a liquid crystal display (LCD)) 201. The display device 202 displays on the screen, display information acquired from the VRAM 201. For example, the display device 202 displays web server settings of the PODSS 102 and the APSS 105, and the web browser of the client PC 103.

A bit move unit (BMU) 203 controls data transfer between memories, or between a memory and a device. A keyboard 204 is an input device including various keys for performing input. A pointing device (PD) 205 is used for pointing an icon on the screen, to click a button, or drag an item.

A central processing unit (CPU) 206 controls the apparatus based on a control program stored in a read-only memory (ROM) 207 (i.e., storing programs for realizing the present exemplary embodiment to be described below).

A RAM 208 is used as a work area for the CPU 206 to execute the above-described programs, and a temporary storage area when performing error processing. An HDD 209 and a Floppy Disk Drive (FDD) 210 are used for storing application programs to be described below, data, a database, and a library.

A network interface (Net-I/F) 211 performs data control and diagnosis on the network for transferring data between the devices via the network. Such devices include the PODSS 102, the client PC 103, and the APSS 105. An input/output (I/O) bus 212 connects each of the units (i.e., an address bus, a data bus, and a control bus).

When the user switches on the apparatus of the above-described configuration, the CPU 206 initializes the apparatus according to a boot program stored in the ROM 207. The CPU 206 then loads the OS from the HDD 209, and activates the various applications.

The apparatus according to the present exemplary embodiment is based on a common information processing apparatus (e.g., the PC), so that the programs are stored in the hard disk. However, the programs may also be stored in the ROM. The present invention is not limited by the type of storage medium. Further, the programs may be stored in a semiconductor storage medium such as a solid state drive (SSD).

<Hardware Configuration of the MFP>

Figure 3:
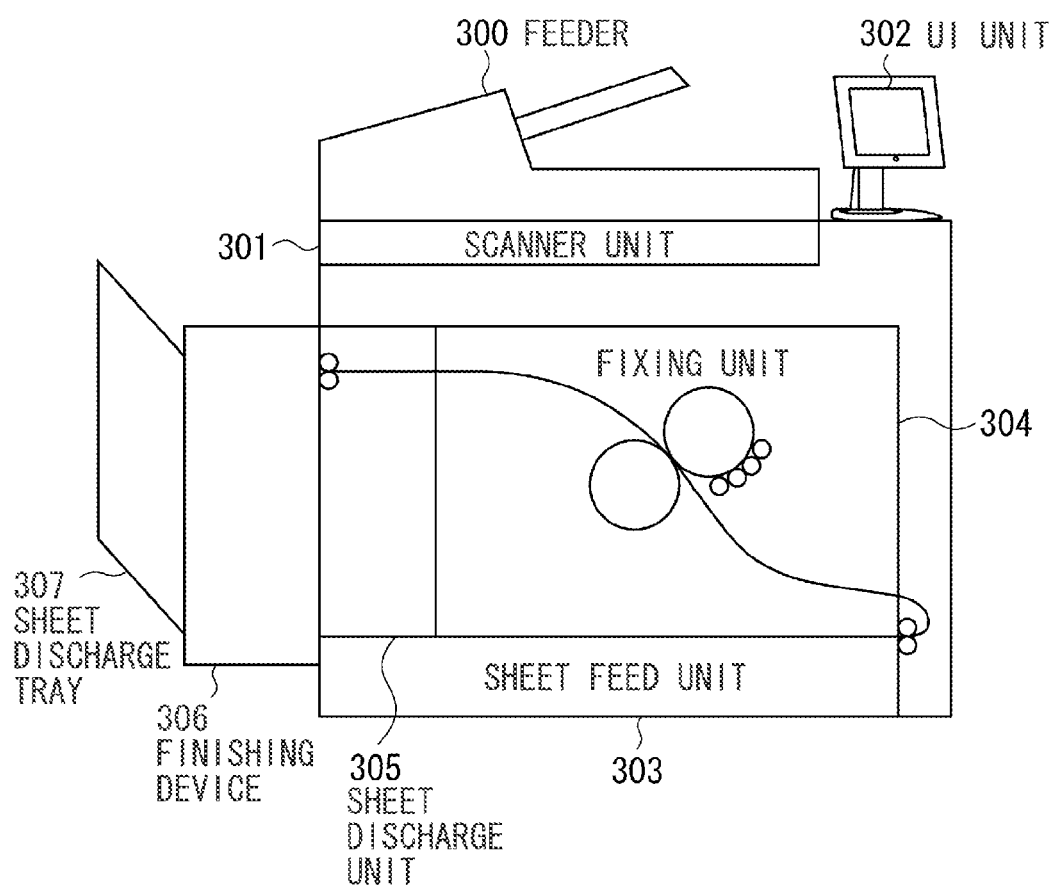
FIG. 3 illustrates a hardware configuration of a MFP illustrated in FIG. 1.

FIG. 3 illustrates the hardware configuration of the MFP 104 included in the print service system illustrated in FIG. 1. According to the present exemplary embodiment, the MFP is described as an example of the image processing apparatus. However, the present invention may also be applicable to a printer.

Referring to FIG. 3, a feeder 300 (i.e., an auto-document feeding unit) automatically feeds a paper document when a scanner unit 301 scans the document. The scanner unit 301 then scans the information on the paper document and digitizes the information. A UI unit 302 displays the web browser for the user to perform operations with respect to the received job in the PODSS 102, or to use the application service provided by the APSS 105.

A sheet feed unit 303 feeds, when the MFP 104 performs printing, a recording sheet to a fixing unit 304. The fixing unit 304 fixes toner on the sheet fed from the sheet feed unit 303 and performs printing. A sheet discharge unit 305 then discharges the sheet which has been printed in the fixing unit 304.

A finishing device 306 performs stapling and hole-punching on the sheet discharged from the sheet discharge unit 305, according to order information. The printed product on which printing and finishing have been performed is discharged to a sheet discharge tray 307. A method for shipping the finalized printed product created by the MFP 104 to the customer is not limited according to the present invention, and a conventional method may be employed.

<Description on the Information Processing Function in the MFP>

Figure 4:
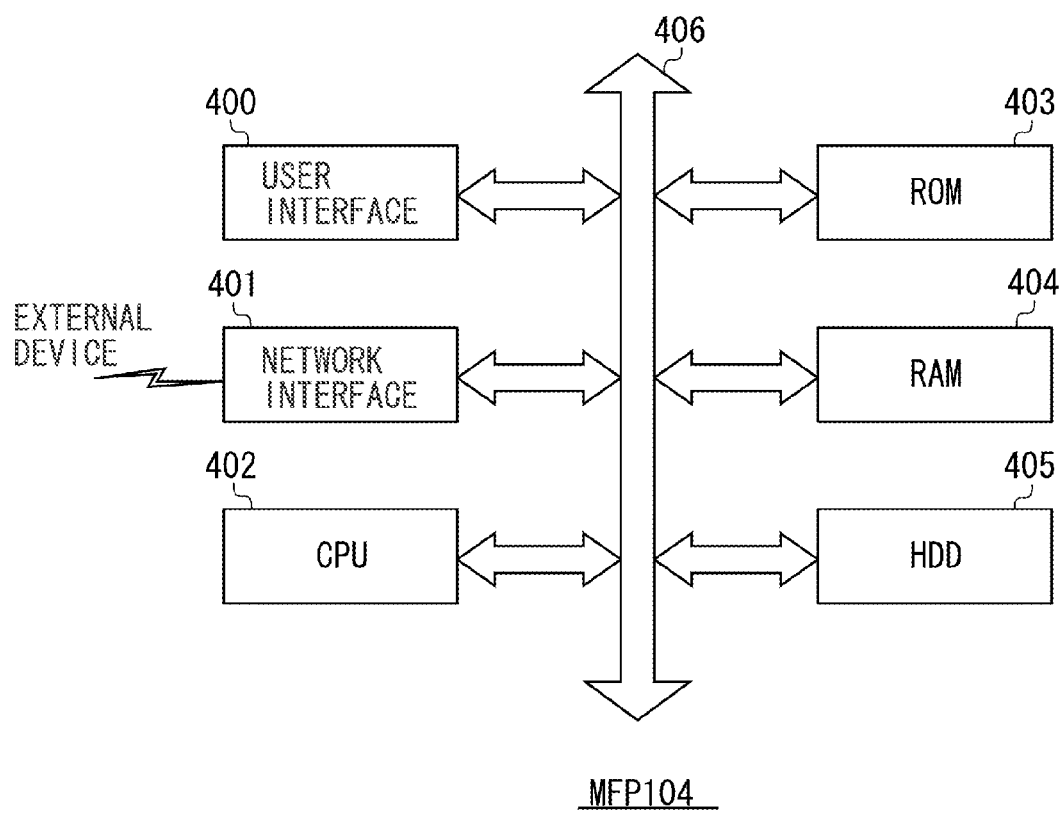
FIG. 4 is a schematic diagram illustrating an information processing function of the MFP illustrated in FIG. 1.

FIG. 4 is a schematic diagram illustrating the information processing function of the MFP 104 included in the print service system illustrated in FIG. 1. Referring to FIG. 4, a user interface 400 provides to the operator a displaying and input means using a web browser 503. A network interface 401 communicates with external devices via the network. The MFP 104 communicates with the PODSS 102 and the APSS 105 via the network interface 401.

A CPU 402 executes programs for controlling the entire MFP, and executes the web browser 503. A ROM 403 records installed programs and data. A RAM 404 is a temporary memory area in which programs are expanded when executed. The web browser 503 which is a feature of the present invention is used by expanding in the RAM 404 the information necessary for execution.

An HDD 405 is a large-scale storage area that stores in the MFP the data transmitted from the external devices. The HDD 405 also stores programs such as the execution program of the web browser 503. An input/output interface 406 connects each of the control units.

<Description of the Software Configuration>

Figure 5:
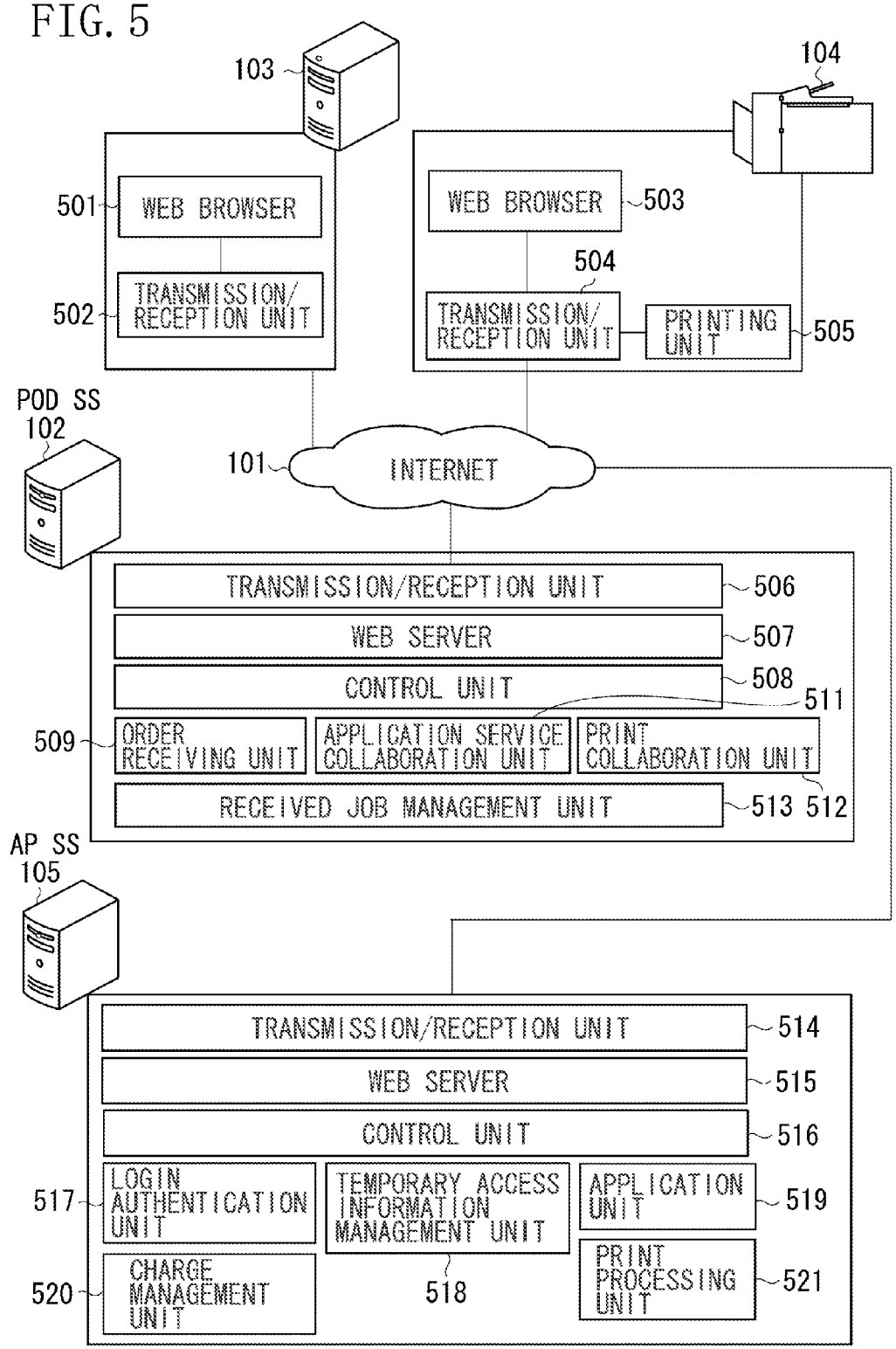
FIG. 5 illustrates a software configuration of a POD system illustrated in FIG. 1.

FIG. 5 illustrates a software configuration of the POD system illustrated in FIG. 1. Referring to FIG. 5, the Internet 101 connects the client PC 103 and the MFP 104 to be communicable with the PODSS 102 and the APSS 105 via each LAN and firewall.

The software configuration in the client PC 103 will be described below. Each of the components included in the client PC 103 is stored in the ROM 207 or the HDD 209 illustrated in FIG. 2, and executed as necessary by the CPU 206 using the RAM 208. A transmission/reception unit 502 in the client PC 103 employs the network I/F 211 to transmit and receive information to and from a transmission/reception unit 506 in the PODSS 102 and a transmission/reception unit 514 in the APSS 105.

A web browser 501 generates an electronic document using a web application provided by a web server 515 in the APSS 105, via at least the transmission/reception unit 502. The web browser 501 issues an order to the POD service provided by a web server 507 in the PODSS 102.

The software configuration in the MFP 104 will be described below. Each of the components included in the MFP 104 is stored in the ROM 403 or the HDD 405 illustrated in FIG. 4, and executed as necessary by the CPU 402 using the RAM 404. A web browser 503 is an application realized on the user interface 400 and runs on the MFP 104. The web browser 503 is used to issue instructions to the PODSS 102 and the APSS 105, and display a screen.

More specifically, the web browser 503 is used to process and instruct printing of the electronic data received by the order receiving side in the POD service. A transmission/reception unit 504 uses the network interface 401 to communicate with the devices on the network.

A printing unit 505 receives the instruction from the web browser 503, and operates each of the hardware for performing printing in the MFP 104 illustrated in FIG. 4. According to the present exemplary embodiment, the user operates on the web browser 503 to perform processing and issues the print instruction. However, this is not a limitation, and the operation may be performed on the PC, such as the client PC 103, as long as the print instruction can be issued to the MFP.

The software configuration in the PODSS 102 will be described below. Each of the components included in the PODSS 102 is stored in the ROM 207 or the HDD 209 illustrated in FIG. 2, and executed as necessary by the CPU 206 using the RAM 208.

A transmission/reception unit 506 uses the network I/F 211 to transmit and receive the information between the transmission/reception unit 504 in the MFP 104 or the transmission/reception unit 502 in the client PC 103 and the PODSS 102.

A web server 507 receives requests from and transmits responses to the web browser 501 in the client PC 103 and the web browser 503 in the MFP 104 via the web. The web server 507 receives and transmits to a control unit 508, the requests from each web browser. The web server 507 also transmits response information received from the control unit 508 to the transmission/reception unit 506.

The control unit 508 performs entire control for the PODSS 102 to exchange information with the other apparatuses and call the necessary processing units. An order receiving unit 509 receives the screens and the files for receiving an order from the client PC 103. Further, the order receiving unit 509 transmits to a received job management unit 513, the received information as the received jobs.

Screen data to be generated may be static hypertext markup language (HTML) data, or dynamic image display data such as Java® Server Pages.

An application service collaboration unit 511 is a feature portion of the present invention. The application service collaboration unit 511 generates an access uniform resource locator (URL), using the limited access information assigned by the ordering user, for accessing the application service. The limited access information is included in the received job managed by the received job management unit 513. The access URL is used to execute a web server 515 in the APSS 105.

More specifically, if it is necessary to process the data using the application service to perform the received job selected by the operator on the MFP 104, the PODSS 102 notifies the MFP 104 of the access URL.

According to the present exemplary embodiment, the PODSS 102 transfers (redirects) the generated access URL to the web browser 503 in the MFP 104. The APSS 105 can thus be accessed from the web browser 503.

On the other hand, if the received job managed by the received job management unit 513 is data that can be directly printed (i.e., processing is not necessary), a print collaboration unit 512 performs a collaboration process. In other words, the printing collaboration unit 512 transmits the received job to the printing unit 505 in the MFP 104 according to the instruction form the web browser 503.

Further, the print collaboration unit 512 uses the access URL received from the application service collaboration unit 511 and similarly transmits to the printing unit 505, finalized print data after processing the data. The received job management unit 513 manages the received jobs issued by the receiving unit 509. The received job management unit 513 receives and transmits the received jobs to the application service collaboration unit 511 and the print collaboration unit 512 and updates the received jobs, according to the type of the received job that is designated.

The PODSS 102 thus manages the received information, performs processing, and generates the print data according to the above-described configuration.

The software configuration in the APSS 105 will be described below. Each of the components included in the APSS 105 is stored in the ROM 207 or the HDD 209 illustrated in FIG. 2, and executed as necessary by the CPU 206 using the RAM 208. The transmission/reception unit 514 uses the network I/F 211 to transmit and receive information between the transmission/reception unit 504 in the MFP 104 or the transmission/reception unit 502 in the client PC 103 and the APSS 105.

A web server 515 is a web application server that receives requests from and transmits responses to the web browser 501 in the client PC 103 and the web browser 503 in the MFP 104 via the web. The web server 515 receives the requests from each web browser and transmits the requests to a control unit 516. The web server 515 also transmits to the transmission/reception unit 514 the response information received from the control unit 508 in the PODSS 102.

The control unit 516 performs entire control for the APSS 105 to exchange information with the other apparatuses and call the necessary processing units. A login authentication unit 517 receives as a login request from the MFP 104 and the client PC 103, login request information via the control unit 516. The login authentication unit 517 then performs an authentication processing and generates web content for displaying the authentication result on the screen.

The display data may be the static hypertext markup language (HTML) data, or the dynamic image display data such as Java® Server Pages (JSP). Further, the control unit 515 transmits to a charging management unit 520, the access information as data for charging.

A temporary access information management unit 518 sets a restriction on use of the access information to be provided to the POD service order receiving side before the client PC 103 issues an order to the PODSS 102.

Methods of restricting the use include time restriction and functional restriction. According to the present invention, there is no particular limit on the restriction method, and any method may be used as long as the restriction disallows illegal usage when the POD service receiving side accesses the APSS 105.

An application unit 519 allows the user to use the applications via the web browsers in the client PC 103 and the MFP 104 as the application service. The types of the applications are not limited as long as they correspond to the data desired by the ordering user.

A print processing unit 521 may be a unit that can generate data that can be interpreted by the printing unit 505 in the MFP 104, and can transmit the interpretable data to the received job management unit 513 in the PODSS 102 via the application service collaboration unit 511. Further, the print processing unit 521 causes the application service to generate the print job by using a device driver, and transmits the print job to an arbitrary output destination.

The charging management unit 520 carries out charging process to calculate the final fee according to the usage based rate, based on the access information when the user has started using the application service, acquired from the login authentication unit 517. The charging process is not limited according to the present invention and may be a general method.

The present invention at least includes the above-described applications, processing units, and control units in each of the devices.

<An Example of Using the Application Service from the Client PC>

Figure 6:
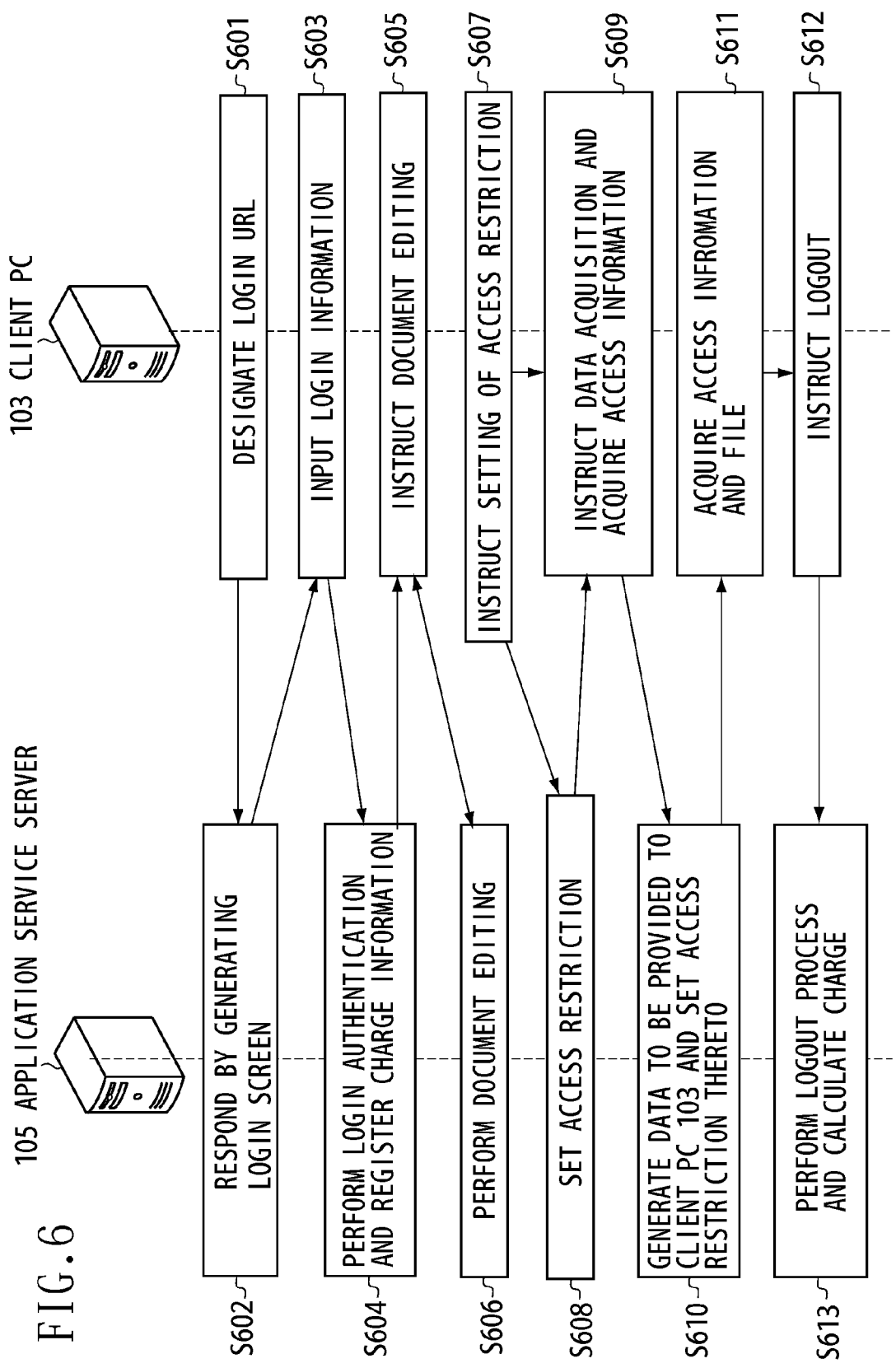
FIG. 6 is a flowchart illustrating data processing performed by the server apparatus and the information processing apparatus.

FIG. 6 is a flowchart illustrating data processing performed by the client PC 103 and the APSS 105 in the print service system illustrated in FIG. 1. According to the example illustrated in FIG. 6, the user of the client PC 103 uses the application service provided by the APSS 105 and generates a document. Each of the processes is realized by the CPU 206 illustrated in FIG. 2 loading to the RAM 208 and executing the control programs stored in the HDD 209 and the ROM 207.

In step S601, the user indicates on the web browser 501 of the client PC 103, the URL for accessing the APSS 105.

In step S602, the APSS 105 generates the login screen in response to the process of step S601 and returns the login screen to the client PC 103. In step S603, the user of the client PC 103 inputs the login information to the screen generated in step S602. More specifically, the user operates on the keyboard 204 and inputs the login request to the screen, using the access information, such as login identification (ID) and a password, provided when previously entering the agreement with the application service provider.

In step S604, the APSS 105 performs the login authentication with respect to the access information input by the user on the screen. If the authentication is successful, the APSS 105 registers login start information to the charging information. The APSS 105 performs a login process using a secure socket layer (SSL) with respect to the login.

The processes performed in step S601 to step S604 may be similar to the login process of a web site that performs a general charging process and is not limited according to the present invention.

In step S605, the user of the client PC 103 issues instructions on editing the document. In step S606, the APSS 105 then edits the document according to the instruction.

The client PC 103 and the APSS 105 repeatedly perform the processes of step S605 and step S606 to generate the final data to be output to the MFP 104. The final data is then transmitted to the MFP 104 via the PODSS 102. The transmission destination of the final data is specified by the settings in the APSS 105 and the client PC 103.

In step S607, when it is determined that generation of the final data is completed, the user instructs on the client PC 103, setting access restriction to the data. In step S608, the APSS 105 receives the access restriction setting instruction from the client PC 103, and the temporary access information management unit 518 sets temporary access information to the object data.

There is no particular limit to the type of restriction to be set, as described above with respect to the temporary access information management unit 518. For example, a processing time of the data may be restricted, or usable service functions may be restricted.

In step S609, the client PC 103 acquires the access URL from the APSS 105 as the access information. An expiration date is previously set to the access URL, and control is performed so that the application service cannot be used when the MFP 104 accesses the APSS 105 after the expiration date.

Further, in step S609, the client PC 103 instructs the APSS 105, acquisition of the object data after setting the access restriction. As described above, the client PC 103 also instructs issuing of the access URL including encryption information of the access information.

In step S610, the APSS 105 generates the data to be provided in response to the data acquisition instruction from the client PC 103. In other words, the data that has been generated on the RAM 208 by performing the above-described processes is stored as a file in the HDD 209.

Further, the APSS 105 reflects the access restriction set in step S608 to the data, and also issues the access information for receiving the application service, including the encryption information of the access information (i.e., application service URL).

Furthermore, the APSS 105 manages, at the same time as issuing the application service URL, the information that is linked to restriction items set in the temporary access information management unit 518. If it is determined that there has been a usage exceeding the restriction items, the APSS 105 invalidates the temporary access in the temporary access information management unit 518. Since the application service URL to use the application service then becomes invalid, misuse is prevented.

In step S611, the client PC 103 acquires the file data generated by the APSS 105 in step S610 and the encryption information in the access information set in step S608.

The file data and the encryption information may be acquired by the client PC 103 downloading the file or the APSS 105 transmitting the file to the client PC 103. According to the present invention, the method is not limited, as long as the data is transmitted to the client PC 103.

In step S612, the client PC 103 issues a logout instruction to the APSS 105. In step S613, upon receiving the logout instruction from the client PC 103, the APSS 105 performs a logout process and calculates the charging information.

As described above, while the user logs into and logs out from the client PC 103, the client PC 103 acquires the document and the access URL from the APSS 105. In such a case, the charging management unit 520 in the APSS 105 charges the user of the client PC 103 a service charge as the usage fee.

The process in which the APSS 105 charges the user of the client PC 103 an application service charge in response to the application service request from the MFP 104 using the access URL will be described below.

<Order Processing Between the Client PC and the PODSS>

Figure 7:
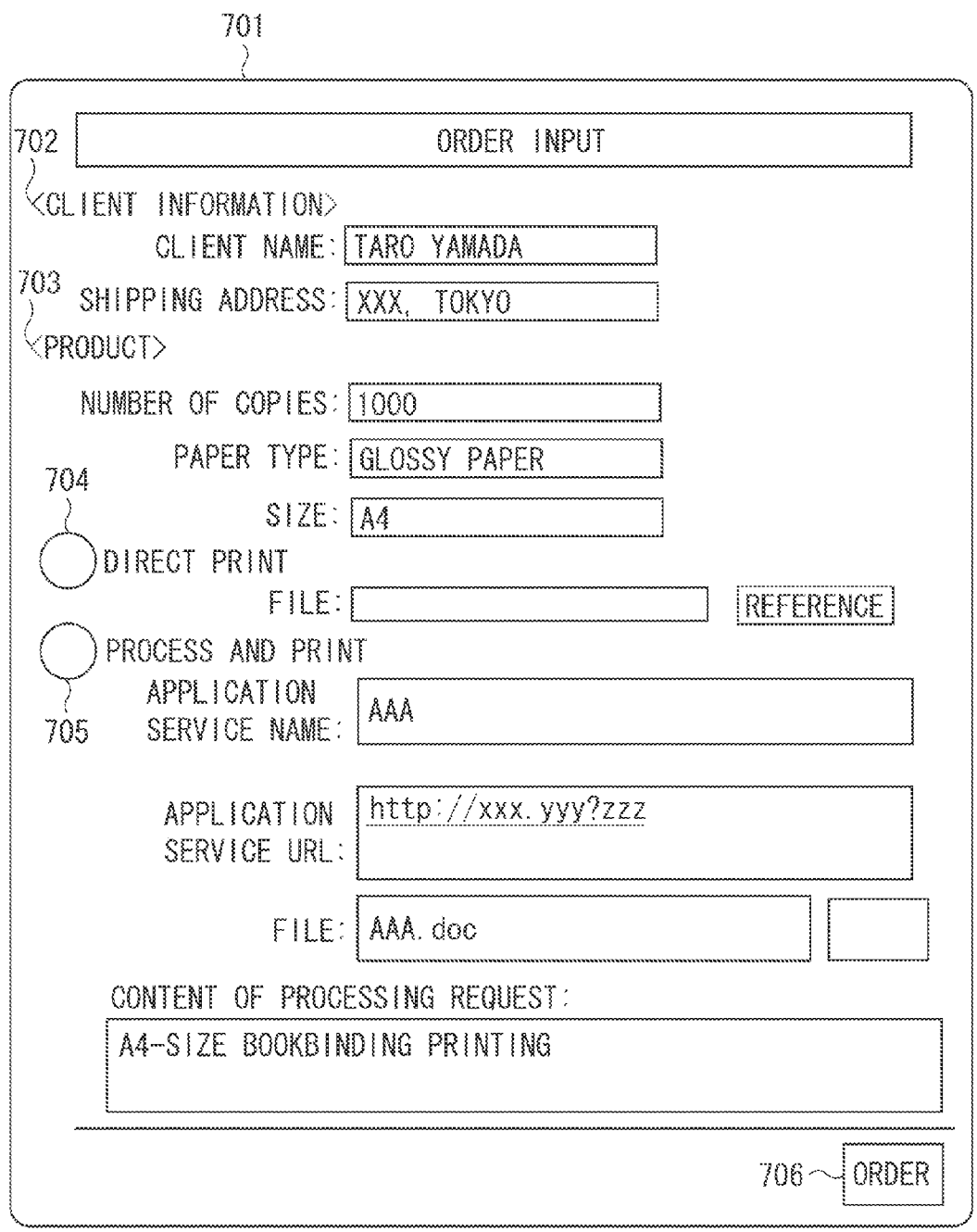
FIG. 7 illustrates an example of a user interface (UI) displayed on a client PC.

FIG. 7 illustrates an example of the user interface displayed on the client PC 103 in the print service system illustrated in FIG. 1, and in particular illustrates a screen for issuing an order to the PODSS 102.

Referring to FIG. 7, an order screen 701 includes a customer information input area 702 in which the user of the client PC 103 inputs a customer name and a shipping address. Contact information such as a telephone number and a company name may also be included. The information by which the customer can be identified and the shipping address of the printed product can be recognized, are input to the customer information 702.

A product input area 703 is an area in which the user inputs information about the printed product. According to the present example, the customer inputs a paper type and a paper size. However, the information is not limited to the paper type and the paper size, as long as it is information by which the customer can inform the POD service provider on the final product.

A print condition input area 704 is selected by the customer when the ordering data is to be directly printed without performing processing. The example illustrated in FIG. 7 indicates that the file to be ordered is to be uploaded. A print condition input area 705 according to the present exemplary embodiment illustrates an example in which the customer requests processing of the data using the APSS 105 by employing the access information of the customer.

More specifically, an application service name text box is for inputting a title of the application service provided by the APSS 105 on the Internet. The APSS 105 can then identify the application name by such information.

An application service URL text box is for inputting the access URL including the access information (i.e., the encryption information) for accessing the target APSS 105, acquired in step S611 illustrated in FIG. 6. A file text box is for designating the document data to be printed. As described above, the file includes a service function restriction.

A processing request content text box is for describing the content of the processing to be performed by the MFP 104 that is used for outputting on the POD service provider side. For example, the customer may designate re-adjustment to be performed by the application service to match the performance of the device, such as lighter printing.

An order button 706 is pressed to issue the order after the customer inputs all of the above-described contents. If the customer presses the order button 706, the order instruction is issued from the client PC 103 to the PODSS 102 via the Internet 101.

<An Example of Received Job Management in the POD Service Server>

Figure 8:
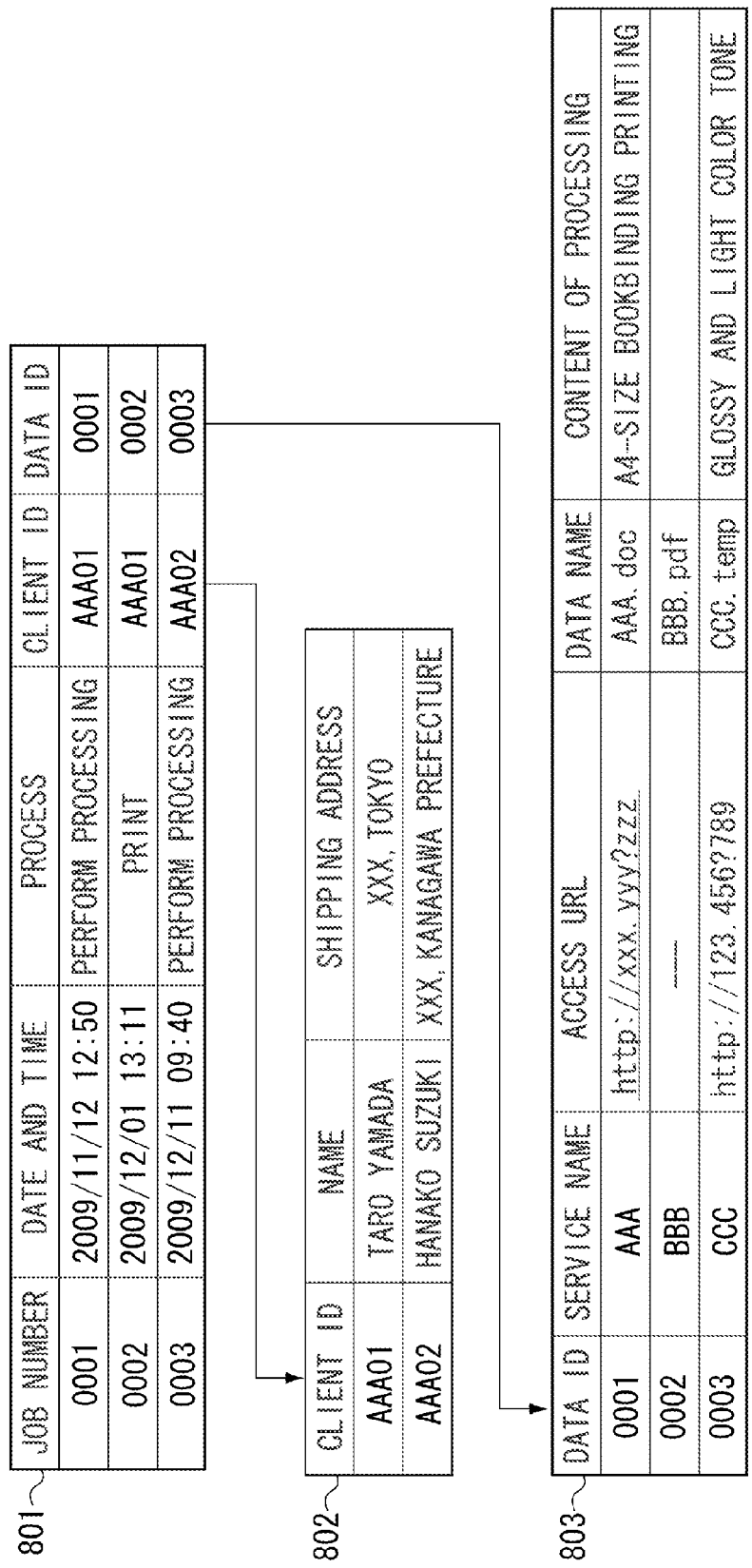
FIG. 8 illustrates a received order management information table managed in a PODSS.

FIG. 8 illustrates an example of a received order management information table in the storage unit, managed by the PODSS 102. A method for managing the received jobs in the PODSS 102 will be described below with reference to FIG. 8.

Referring to FIG. 8, a received job list table 801 includes a job number that can uniquely identify the received job, received date and time, processing content indicating whether to perform direct printing or processing, a customer ID for identifying the customer, and a data ID for identifying the data. The received job list table 801 is stored and managed in the HDD 209.

A customer information management table 802 includes the customer name and the shipping address and is managed by employing the customer ID in the received job list table 801 as the key. The customer information management table 802 is stored and managed in the HDD 209.

A data management table 803 includes the information to be described below and is managed by employing the data ID in the received job list table 801 as the key. The data management table 803 is stored and managed in the HDD 209.

According to the present exemplary embodiment, the data management table 803 includes an application service name and the access URL in the case where processing is necessary, the ordering data attached when the job is ordered, and the processing content when the data is to be processed.

The actual data described in the data ID is stored in the HDD 209 in the PODSS 102 to be retrievable. The above-described configuration is an example of the received job management performed in the PODSS 102.

<Processing Using a Processing Job Application Service>

Figure 9:
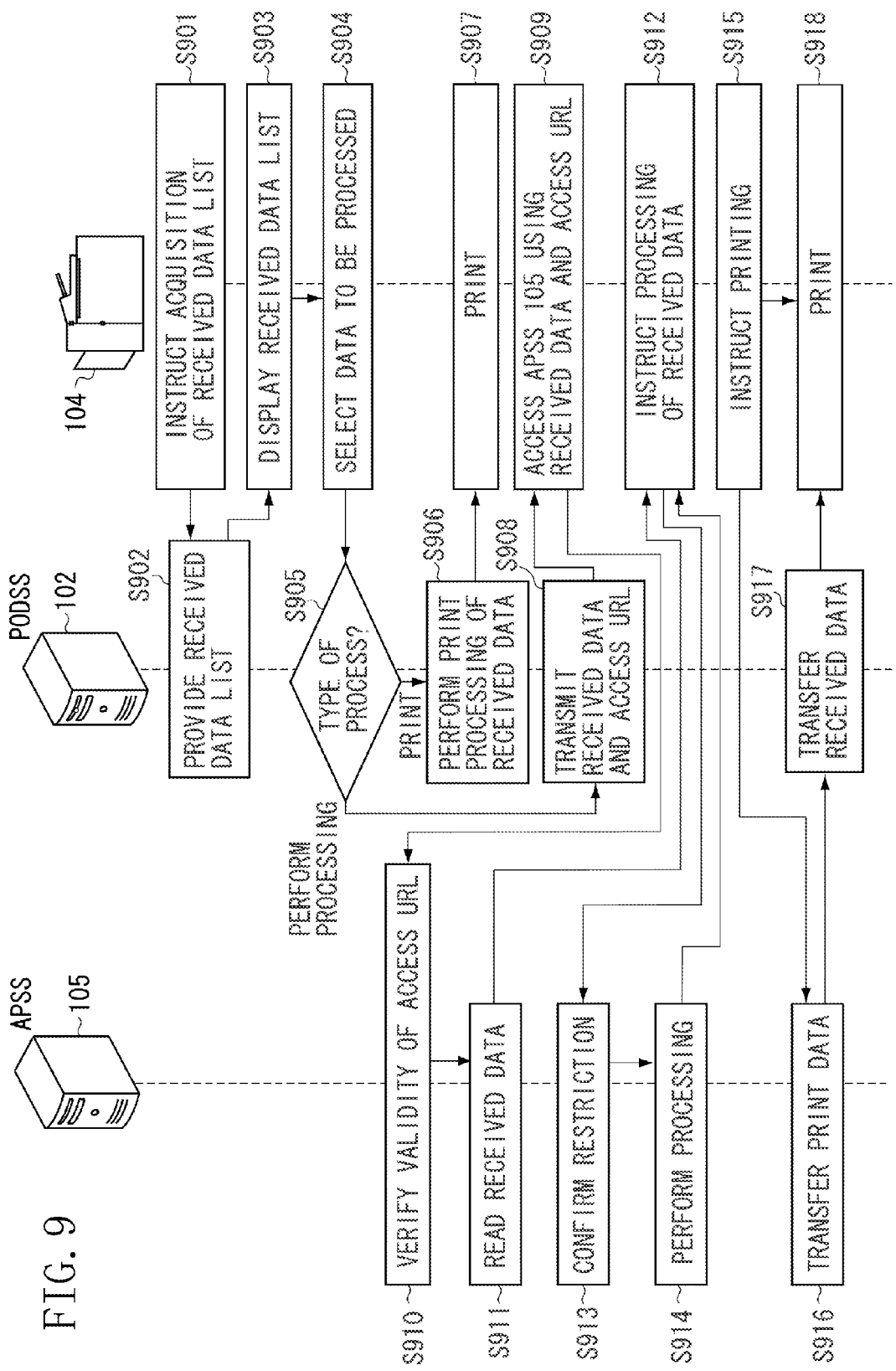
FIG. 9 is a flowchart illustrating data processing performed by the print service system.

FIG. 9 is a flowchart illustrating data processing performed in the print service system according to the present exemplary embodiment. FIG. 9 illustrates an example in which the MFP 104 processes or prints each of the data managed as the received jobs in the PODSS 102. In the case where the data is to be processed, the MFP 104 processes the data using the application service in the APSS 105 by employing the access URL notified from the PODSS 102.

Each of the processes performed by the PODSS 102 and the APSS 105 are realized by the CPU 206 illustrated in FIG. 2 loading to the RAM 208 and executing the control programs stored in the HDD 209 and the ROM 207. Further, the processes performed by the MFP 104 are realized by the CPU 402 illustrated in FIG. 4 loading to the RAM 404 and executing the control programs stored in the ROM 402 and the HDD 405.

In step S901, the MFP 104 issues an instruction to the PODSS 102 for acquiring the list of received jobs that the PODSS 102 has received and has not yet executed. The process is performed by the operator using the web browser 503 in the MFP 104.

In step S902, the PODSS 102 receives the instruction issued in step S901 and provides the MFP 104 with the received order data list. In step S903, the MFP 104 displays the received order data list provided by the PODSS 102 in step S902. In step S904, the operator selects on the MFP 104 the process to be performed on the received order data to be processed included in the displayed received order data list.

In step S905, the PODSS 102 determines whether the type of process to be performed on the received order data, instructed from the MFP 104, is to directly print or perform processing. The CPU 206 in the PODSS 102 determines based on whether the content of the processing item in the list table 801 indicates "perform processing" or "print".

If the CPU 206 in the PODSS 102 determines that the received order data is to be directly printed (PRINT in step S905), the process proceeds to step S906. In step S906, the PODSS 102 performs print processing with respect to the MFP 104. In step S907, upon receiving the print data as a result of the PODSS 102 performing print processing, the MFP 104 prints the print data.

On the other hand, if the CPU 206 in the PODSS 102 determines that the received order data is to be processed (PROCESS in step S905), the process proceeds to step S908. In step S908, the PODSS 102 notifies the web browser 503 in the MFP 104 of the received order data and the access URL for accessing the APSS 105.

In step S909, the MFP 104 accesses the APSS 105 using the received order data and the access URL notified from the PODSS 102 in step S908.

In step S910, the APSS 105 verifies whether the access URL that the MFP 104 used in accessing the APSS 105 in step S909 is correct, i.e., the validity of the access URL. More specifically, the APSS 105 determines whether the access information, such as the access URL used by the MFP 104, is registered in the application service collaboration unit 511, and whether it does not exceed the usage restriction. The access information corresponds to the access URL that the APSS S105 has set to the client PC 103 in step S608 illustrated in FIG. 6.

If the application service collaboration unit 511 determines in step S901 that the received job is to be reprinted and thus exceeds the usage restriction, control can be performed so that the application service cannot be used. Further, if the access information of the APSS 105 has changed by a revision in the agreement after receiving the order, the application service collaboration unit 511 can perform control so that the application service cannot be used.

In step S911, the APSS 105 reads the received order data transmitted together with the access information from the MFP 104. The method for transmitting the received order data may be a known method, and there is no particular limit according to the present invention.

In step S912, the MFP 104 instructs the APSS 105 via the Internet 101 to process the received order data.

In step S913, the CPU 206 in the APSS 105 determines as appropriate, whether the processing instruction received from the MFP 104 in step S912 exceeds the usage restriction. If the APSS 105 determines that the content of the instruction exceeds the usage restriction, the process is cancelled.

If the CPU 206 in the APSS 105 determines that the content of the instruction does not exceed the usage restriction, the process proceeds to step S914. In step S914, the APSS 105 processes the received order data according to the processing request received from the MFP 104 in step S914. The processing desired by the customer is thus realized by repeating the processes of step S912 to step S914.

The CPU 206 in the APSS 105 performs processing in response to the request from the customer. For example, the CPU 206 specifies print settings for performing bookbinding, as an application service. Further, the CPU 206 may specify color settings using the actual device information of the MFP 104. According to the present invention, there is no limit on the types of processing as long as processing is performed on the received order data.

In step S915, the CPU 402 in the MFP 104 issues a print instruction after processing has been completed. In step S916, the CPU 206 in the APSS 105 receives the instruction from the MFP 104 issued in step S915, generates the print data that can be interpreted by the MFP 104, and transfers the generated print data to the PODSS 102.

Since the operator of the MFP 104 has previously designated the PODSS 102 as the print destination as a function of the application service, the APSS 105 can identify the PODSS 102 as the transfer destination of the print data.

In step S917, the PODSS 102 receives the print data from the APSS 105 and transfers the data to the MFP 104. In step S918, the MFP 104 receives the print data from the PODSS 102 and prints the print data. When the print data is printed, the printed product based on the received order data is completed.

When the MFP 104 issues the print instruction to the APSS 105 in step S915, the application service collaboration 511 in the PODSS 102 is set as an output destination of the print data. The print data can thus be transmitted to the PODSS 102 in step S916 according to the print instruction from the MFP 104 to the APSS 105.

Figure 10:
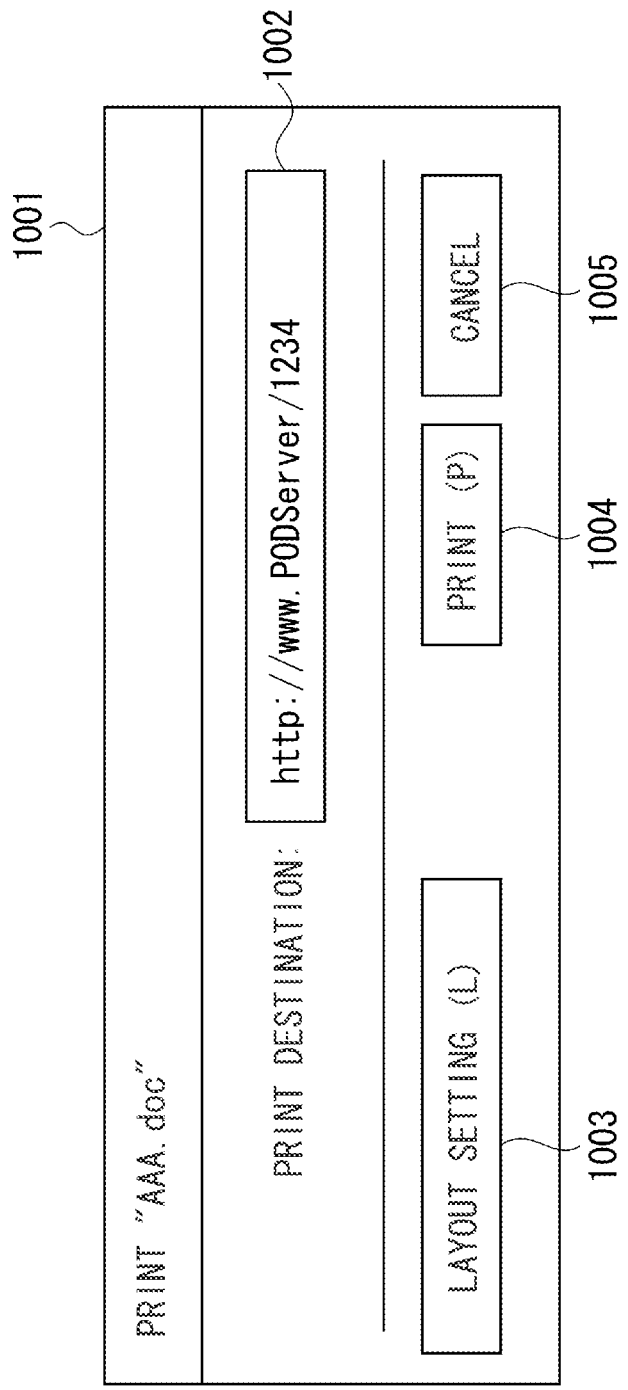
FIG. 10 illustrates a UI displayed on the MFP.

FIG. 10 illustrates an example of the user interface displayed on the MFP 104 illustrated in FIG. 1. FIG. 10 illustrates an example of a screen for issuing the print instruction to the application.

Referring to FIG. 10, a print destination text box 1002 in a print instruction screen 1001 is used for designating the print destination. In the example illustrated in FIG. 10, the output destination with respect to the PODSS 102 is designated as "http://www.PODServer/1234". A layout setting button 1003 is used to call an output layout setting dialog. Since the setting dialog is similar to that of a general print driver, description will be omitted. The print instruction screen 1001 also includes a print instruction button 1004 and a cancel button 1005 for cancelling printing.

<Flowchart of the POD Service Server>

Figure 11:
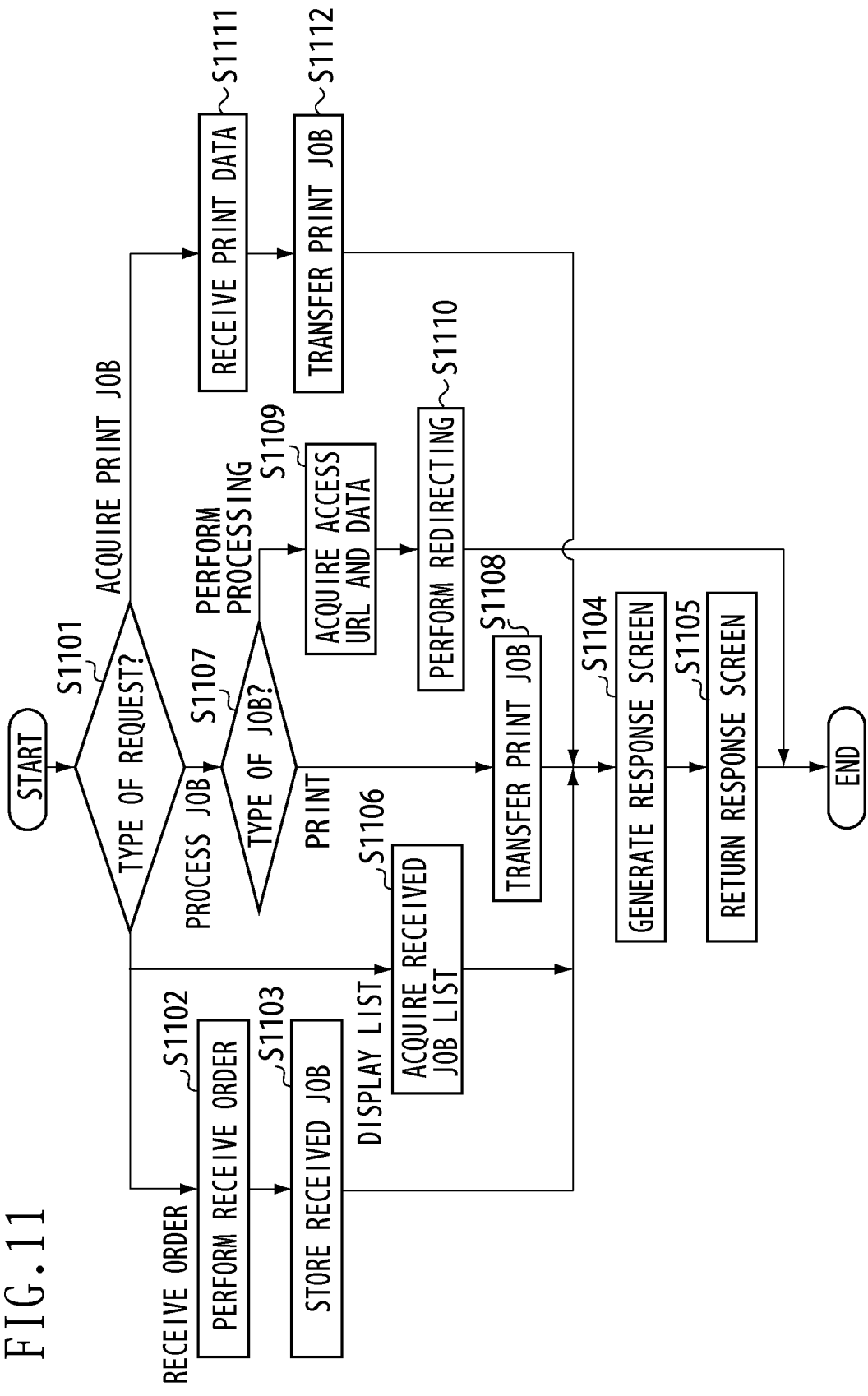
FIG. 11 is a flowchart illustrating a data processing procedure of the server apparatus.

FIG. 11 is a flowchart illustrating an example of a data processing procedure of the server apparatus according to the present exemplary embodiment. The example illustrated in FIG. 11 is a flowchart of each of the processes performed by the PODSS 102 in relation to the client PC 103 and the MFP 104. Each step is realized by the CPU 206 illustrated in FIG. 2 loading to the RAM 208 and executing the control programs stored in the HDD 209 and the ROM 207.

In step S1101, the control unit 508 in the PODSS 102 determines the type of request received from each of the client PC 103 and the MFP 104. The determination process includes transferring of the print data from the APSS 105.

The process diverges as a result of the determination process performed in step S1101, and each of the processes, i.e., "receive order", "display list", "execute job", "instruct job execution" (print and process), and "acquire print job", is executed according to the type of request.

If the control unit 508 determines that the type of request is "receive order" (RECEIVE ORDER in step S1101), the process proceeds to step S1102. In step S1102, the above-described order receiving process is performed. More specifically, the PODSS 102 receives the order information input by the customer using the client PC 103, and transmits an e-mail indicating that the order has been received.

In step S1103, the received job management unit 513 stores each of the received order information in the table illustrated in FIG. 8. In step S1104, the web server 507 generates a response screen. In step S1105, the PODSS 102 performs a response process to the client PC 103.

If the control unit 508 determines in step S1101 that the MFP 104 has requested to "display list" (DISPLAY LIST in step S1101), the process proceeds to step S1106. In step S1106, the control unit 508 acquires the received job list from the received job management unit 513. In step S1104, the web server 507 generates the response screen. In step S1105, the PODSS 102 returns the response screen to the MFP 104.

If the control unit 508 determines in step S1101 that the MFP 104 has requested to "execute job" (EXECUTE JOB in step S1101), the process proceeds to step S1107. In step S1107, the control unit 508 determines the type of job, i.e., whether the job is to "print" or "perform processing". If the control unit 508 determines that the job type is to print (PRINT in step S1107), the process proceeds to step S1108. In step S1108, the PODSS 102 transmits the print job to the MFP 104 for performing printing.

On the other hand, if the control unit 508 determines that the job type is to perform processing (PERFORM PROCESSING in step S1107), the process proceeds to step S1109. In step S1109, the control unit 508 acquires from the management table managed by the received job management unit 513, the access URL and the data to be processed. The control unit 508 then generates from the acquired access URL, the access information for redirecting.

In step S1110, the control unit 508 responds to the MFP 104 via the transmission/reception unit 506, by notifying of the access URL for accessing the APSS 105. The redirect processing performed in step S1110 corresponds to the processes performed in step S905, step S908, step S909, and step S910 illustrated in FIG. 9. In other words, if the PODSS 102 determines that the execution of the process is to be transferred to the APSS 105, the PODSS 102 returns the access URL to the browser in the MFP 104, so that the process proceeds from the MFP 104 to the APSS 105.

If the control unit 508 determines in step S1101 that the MFP 104 has requested to "acquire the print job" (ACQUIRE PRINT JOB in step S1101), the process proceeds to step S1111. In step S1111, the PODSS 102 receives the print data on which the APSS 105 has performed print processing, illustrated in the screen illustrated in FIG. 10 that is displayed in the MFP 104.

According to the present exemplary embodiment, the PODSS 102 once receives the print job, so that the PODSS 102 unifies management of the received jobs.

In step S1112, the PODSS 102 transfer to the MFP 104 the received print data similarly as in step S1108 and performs printing. The process then jumps to step S1104 to create the response screen. In step S1105, the PODSS 102 responds to the client PC 103. The process then ends.

As described above, according to the present exemplary embodiment, the image processing apparatus can use the application service provided by the first server apparatus by employing the access information assigned to the print job received by the second server apparatus. In other words, the image processing apparatus can use the application service provided by the first server apparatus by employing the limited access information, even when there is no agreement entered between the second server apparatus which receives the job, and the first server apparatus, with respect to the application service.

According to the above-described exemplary embodiment, a single application is executed to process the received job. However, the present invention can also be applied to a case where the received job uses a plurality of applications. Such an exemplary embodiment will be described below.

For example, the received job according to the present exemplary embodiment includes a first page of the received job created using a document editing application, and a second page created by a spreadsheet application. Each of the applications is provided by the APSS 105 on the Internet.

Figure 12:
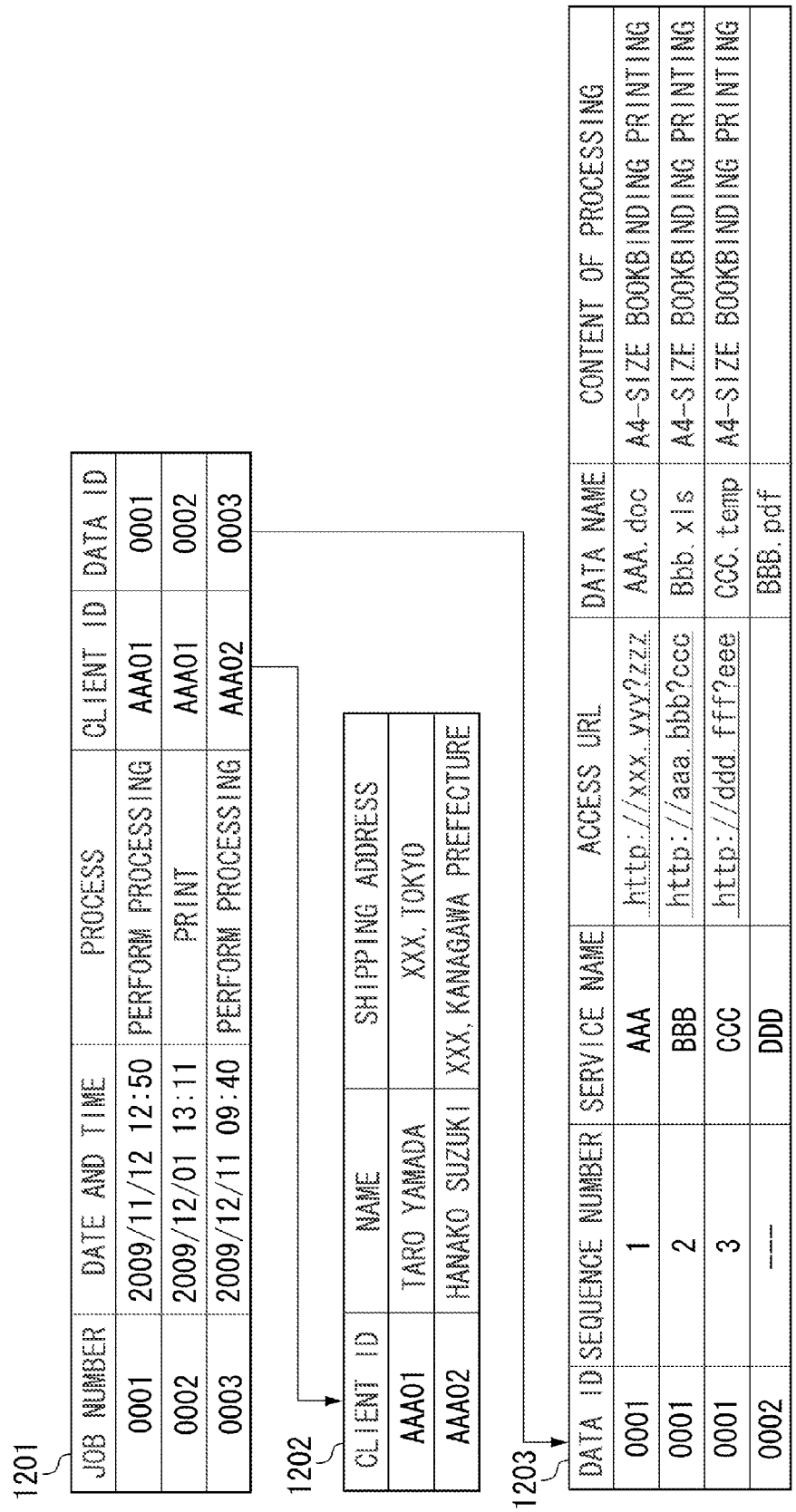
FIG. 12 illustrates a received order management information table managed in the POD.

FIG. 12 illustrates an example of the received order management information table that is managed in the PODSS 102 illustrated in FIG. 5 according to the present exemplary embodiment. A method for managing the received jobs in the PODSS 102 will be described below with reference to FIG. 12. Referring to FIG. 12, a list table 1201 is a table that manages the received jobs, similarly as the list table 801 illustrated in FIG. 8.

A customer information management table 1202 is a table for managing the customers, similarly as the customer information management table 802 illustrated in FIG. 8. A data management table 1203 manages the actual data of the received jobs. Since a plurality of data is included in one job, the data configuration in the print job is managed using a "suffix number". For example, the received job number 0001 is stored as data ID 0001, and includes three data that are assigned suffix numbers 1, 2, and 3 respectively.

Figure 13:
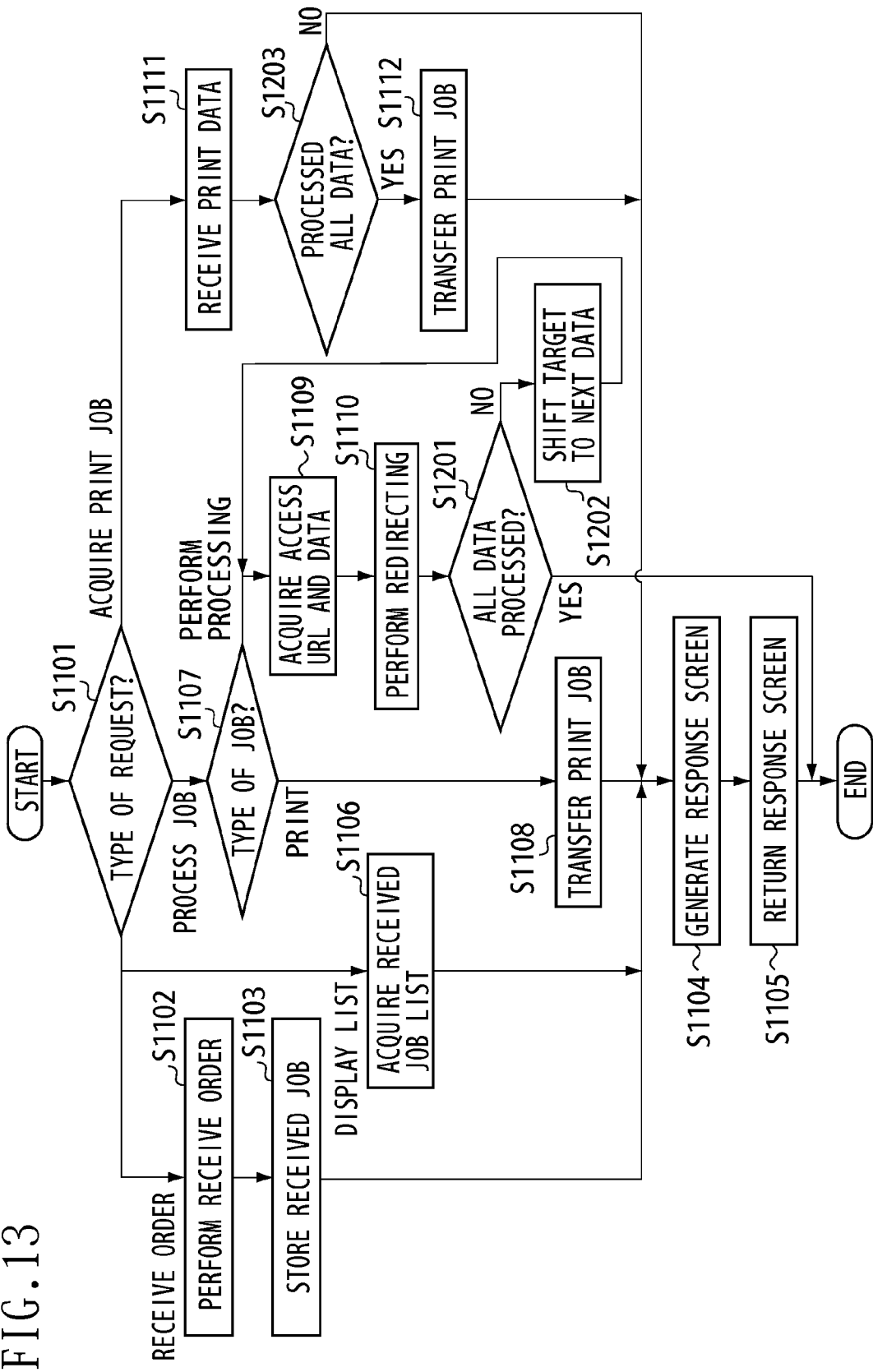
FIG. 13 is a flowchart illustrating a data processing procedure of the server apparatus.

FIG. 13 is a flowchart illustrating an example of the data processing procedure performed by the server apparatus according to the present exemplary embodiment. The example illustrated in FIG. 13 is a flowchart of each of the processes performed by the PODSS 102 in relation to the client PC 103 and the MFP 104.

Each step is realized by the CPU 206 illustrated in FIG. 2 loading to the RAM 208 and executing the control programs stored in the HDD 209 and the ROM 207.

A process in which the print job including a plurality of data is executed by accessing each application service server and performing print processing after synchronizing the print data, will be described below. Since the processes performed in step S1101 to step S1112 are similar to those described in FIG. 11, description will be omitted.

In step S1201, the control unit 508 in the PODSS 102 determines, after redirecting execution of data processing to the MFP 104, whether redirecting has been performed with respect to all of the data. If the control unit 508 determines that not all of the data has been redirected (NO in step S1201), the process proceeds to step S1202. In step S1202, the control unit 508 shifts the target to the next data, and the process returns to step S1109.

It is not necessary to redirect the data to the same web browser, and all of the data may be opened at once by opening new tabs on a tab browser. Further, the control unit 508 may wait until the processing currently redirected and displayed is completed in step S1202, and then perform the operation using the next data. There is no limit to the method as long as all data can be processed.

According to the present exemplary embodiment, the data of a plurality of applications is used, so that it is necessary to control a printing order. The process of step S1203 to be described below is thus performed between receiving the print data in step S1111 and transferring the print job in step S112.

In step S1203, the control unit 508 determines whether the data processing has ended and all of the print processing has been performed, based on determining whether all of the print data has been received. If the control unit 508 determines that not all of the print data has been received (NO in step S1203), the process proceeds to step S1104, and the control unit 508 generates the response screen. On the other hand, if the control unit 508 determines that data processing has been completed and all of the print processing has been performed (YES in step S1203), the process proceeds to step S1112. In step S1112, the control unit 508 transfers the print job to the MFP 104.

As described above, according to the second exemplary embodiment of the present invention, the received job including the plurality of data can be executed even when each data is realized by a different application service server.

According to the first and second exemplary embodiments of the present invention, the server receiving the job does not possess the access information of the APSS 105 to be used. However, the present invention is applicable to a case where the server receiving the job previously possesses the access information for accessing the APSS 105 to be used, as will be described below.

FIG. 14 illustrates an example of the user interface displayed on the client PC 103 in the print service system illustrated in FIG. 1. The example illustrated in FIG. 14 indicates an input to the screen for ordering from the client PC 103 to the PODSS 102.

Referring to FIG. 14, if the user of the client PC 103 checks a check box 1401 that indicates "use application service employing access information in POD service", a request to use the access information in the POD service server is issued when the POD service server includes the access information.

The received order data can be stored by setting "customer" and "provider" flags to the access information stored in the list table 801 illustrated in FIG. 8 and the list table 1201 illustrated in FIG. 12.

Further, in step S1109 of the flowchart illustrated in FIG. 13, the control unit 508 in the PODSS 102 determines the status of the flag corresponding to the check box 1401 in the screen illustrated in FIG. 14. If the control unit 508 determines that the flag is on, the control unit 508 checks whether the access information is possessed by the order receiving side. If there is the access information, the control unit 508 performs the redirecting process based on the access URL using the access information.

As described above, according to the third exemplary embodiment of the present invention, if the order receiving side already possesses the access information of the application server 105, the access information in the POD service server can be used.

The present invention may also be realized by supplying software (i.e., a program code) that can implement the functions of the above-described exemplary embodiments to a system or an apparatus via a network or a storage medium, and reading out and executing the program code stored in the storage medium by a computer (or a CPU or a micro-processing unit (MPU)) of the system or apparatus.

Further, the present invention is not limited to the above-described exemplary embodiments, and various modifications (including organized combinations of each of the exemplary embodiments) on the basis of the spirit of the invention may be made and are not excluded from the scope of the invention.

The present invention is not limited to the above-described exemplary embodiments and may also be realized by supplying software (i.e., a program code) that can implement the functions of the above-described exemplary embodiments to a system or an apparatus via a network or a storage medium, and reading out and executing the program code stored in the storage medium by a computer (or a CPU or a MPU) of the system or apparatus. In such a case, the program code itself and a storage medium which stores the program code constitute the present invention. Further, the present invention is not limited to the above-described exemplary embodiments, and various changes and modifications can be made. The scope of the present invention is determined on the basis of the following claims While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-100828 filed Apr. 26, 2010, which is hereby incorporated by reference herein in its entirety.

What is claimed is:

1. A print service system comprising:
an information processing apparatus;
an image processing apparatus;
a first server apparatus configured to provide an application service to the information processing apparatus; and
a second server apparatus configured to receive a print job generated by the information processing apparatus using an application service and provide a print service,
wherein the second server apparatus comprises:
a management unit configured to register, from a job ordered from the information processing apparatus, to a storage unit and manage access information to which information for limiting an application service is added, and received order data;
a transmission unit configured to transmit to the image processing apparatus, received order data and the access information according to a print request from the image processing apparatus;
a receiving unit configured to receive from the first server apparatus print data generated according to a request from the image processing apparatus; and
a transferring unit configured to transfer to the image processing apparatus the print data received by the receiving unit,
wherein the image processing apparatus comprises:
a requesting unit configured to receive the access information and received order data from the second server apparatus, and request, using the access information the first server apparatus for an application service with respect to the received order data; and
a printing unit configured to receive from the second server apparatus and print the print data corresponding to the received order data requested by the image processing apparatus to the first server apparatus, and
wherein the first server apparatus comprises:
a determination unit configured to determine, according to the access information acquired from the image processing apparatus, whether to allow or disallow an application service request with respect to the received order data;
a generation unit configured to perform, if the determination unit allows an application service request, an application service with respect to received order data received from the image processing apparatus and generating print data;
a transferring unit configured to transfer to the second server apparatus the print data generated by the generation unit; and
a charging unit configured to charge a registered customer identified by the access information, every time an application service is performed with respect to received order data requested from the image processing apparatus.

2. The print service system according to claim 1, wherein the information for limiting the application service includes a usage period for using an application service and service functions.

3. The print service system according to claim 1, wherein the second server apparatus further includes a second determination unit configured to determine whether there is a request to use the application service in received order data requested from the image processing apparatus, and
wherein the transferring unit of the second server transfers, if the second determination unit determines that there is a request to use the application service, the access information and received order data to the image processing apparatus.

4. A print processing method performed by a print service system including an information processing apparatus, an image processing apparatus, a first server apparatus configured to provide an application service to the information processing apparatus, and a second server apparatus configured to receive a print job generated by the information processing apparatus using an application service and provide a print service, the print processing method comprising:
registering, by the second server apparatus, from a job ordered from the information processing apparatus, to a storage unit and managing access information to which information for limiting an application service is added, and received order data;
transmitting, by the second server apparatus, to the image processing apparatus received order data and the access information according to a print request from the image processing apparatus;
receiving, by the second server apparatus, from the first server apparatus the print data generated according to a request from the image processing apparatus; and
transferring, by the second server apparatus, the received the print data to the image processing apparatus,
receiving, by the image processing apparatus, the access information and received order data from the second server apparatus, and requesting, using the access information, the first server apparatus for an application service with respect to the received order data; and
receiving, by the image processing apparatus, from the second server apparatus and printing the print data corresponding to the received order data requested by the image processing apparatus to the first server apparatus, and determining, by the first server apparatus, according to the access information acquired from the image processing apparatus, whether to allow or disallow an application service request with respect to the received order data, performing, by the first server apparatus, if it is determined to allow an application service request, an application service with respect to the received order data received from the image processing apparatus and generating print data, transferring, by the first server apparatus, the generated print data to the second server apparatus, and charging, by the first server apparatus, a registered customer identified by the access information, every time an application service is performed with respect to received order data requested from the image processing apparatus.

* * * * *